Sept. 6, 1949.  C. J. McDOWALL ET AL  2,480,946
TORSIONAL VIBRATION DAMPER
Filed Sept. 2, 1943  5 Sheets-Sheet 1

Inventors
Charles J. McDowall &
Oscar V. Montreth
By
Blackmore, Spencer & Olive
Attorneys

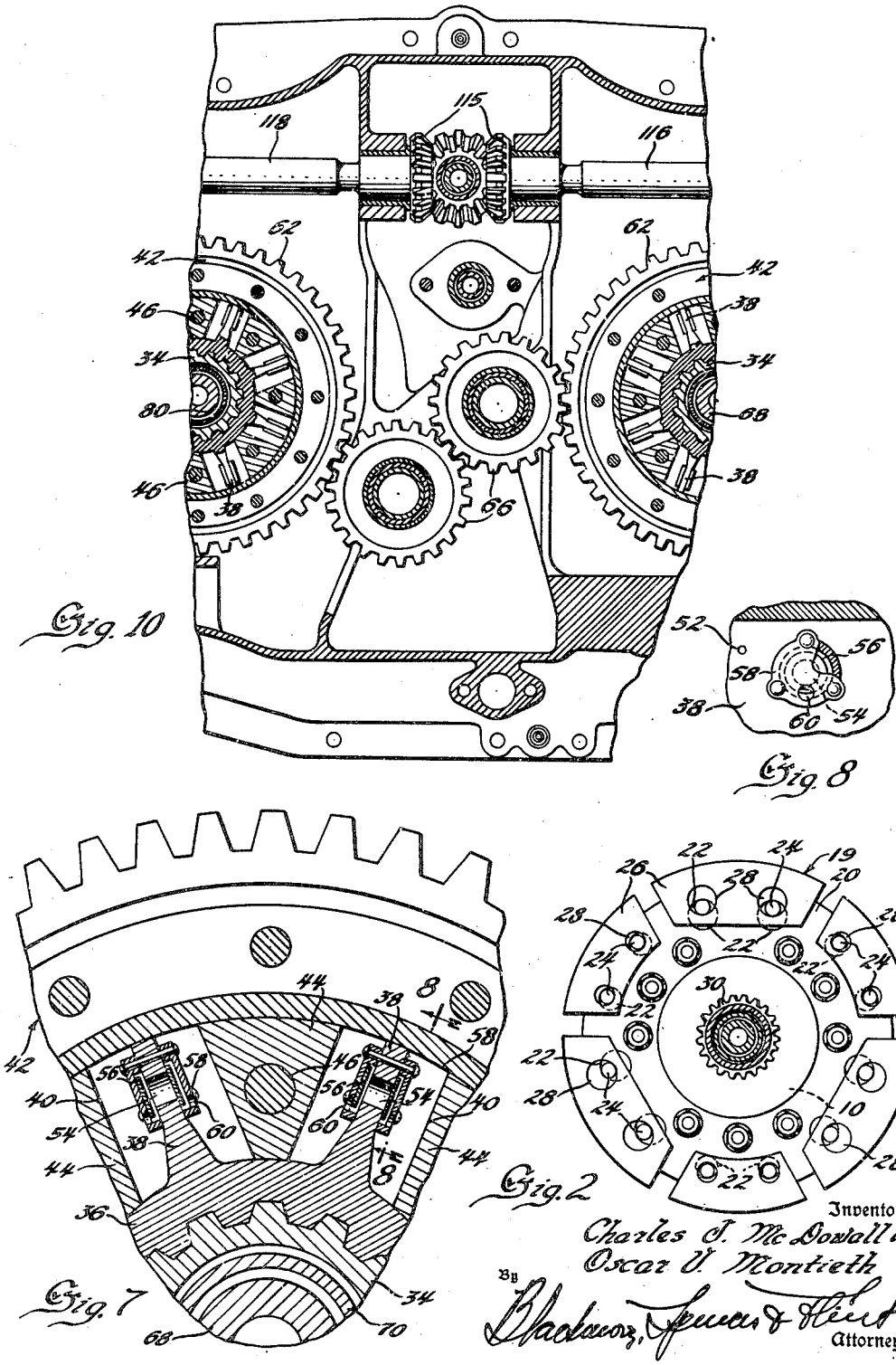

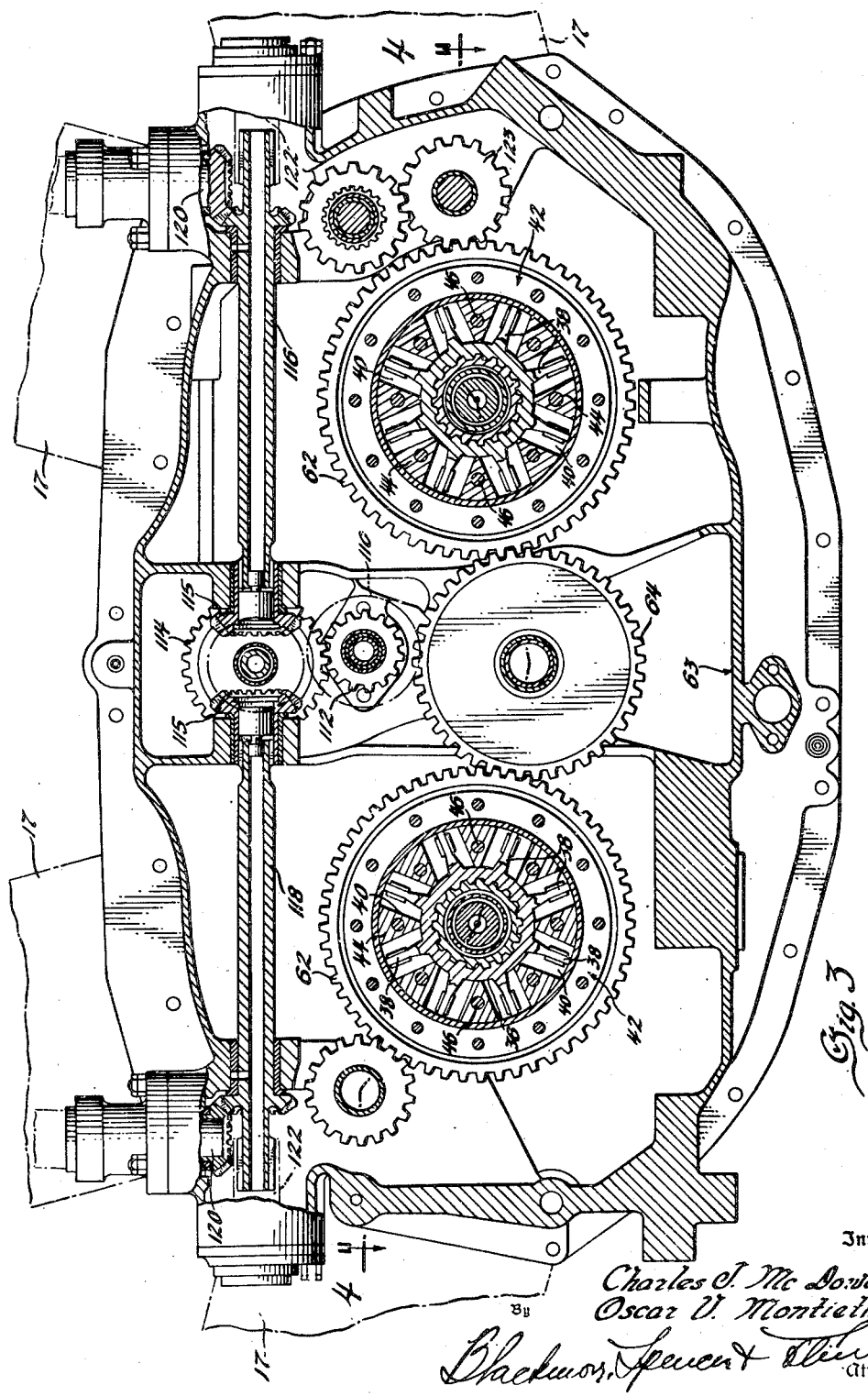

Sept. 6, 1949.　　　　C. J. McDOWALL ET AL　　　　2,480,946
TORSIONAL VIBRATION DAMPER
Filed Sept. 2, 1943　　　　　　　　　　　　　　　5 Sheets-Sheet 4
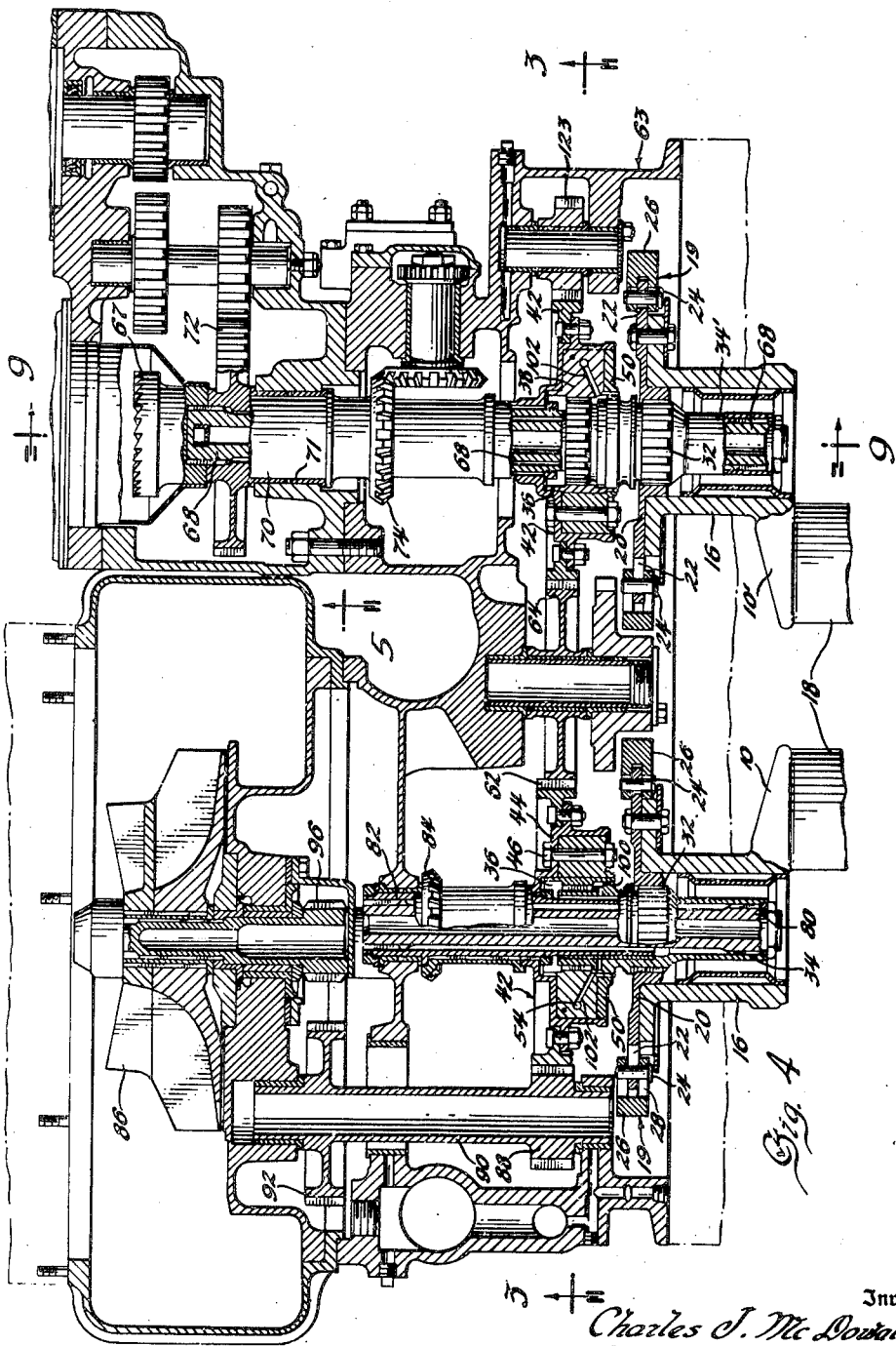
Inventors
Charles J. McDowall &
Oscar V. Montieth
By Blackmore, Spencer & Oliver
Attorneys Sept. 6, 1949.   C. J. McDOWALL ET AL   2,480,946
TORSIONAL VIBRATION DAMPER Filed Sept. 2, 1943   5 Sheets-Sheet 5

Inventors
Charles J. McDowall &
Oscar V. Montieth
By Blackmor, Spencer & Flint
Attorneys Patented Sept. 6, 1949

2,480,946

UNITED STATES PATENT OFFICE 2,480,946

TORSIONAL VIBRATION DAMPER

Charles J. McDowall and Oscar V. Montieth, Indianapolis, Ind., assignors to General Motors Corporation, Detroit, Mich., a corporation of Delaware Application September 2, 1943, Serial No. 500,950

13 Claims. (Cl. 74—574)

This invention has to do with damping torsional vibration and is particularly applicable to engines. In the specific embodiment disclosed the invention is applied to an internal combustion engine having a plurality of crankshafts connected to drive a common output shaft such as the propeller shaft of an airplane. Secured to one end of each of the crankshafts, preferably to the end opposite that from which the propeller is driven, is a torsional vibration damper of the type that dissipates the energy of vibration in friction or cushion. This damper is preferably of the hydraulic type and includes an inner torsionally flexible shaft—called a quill shaft—driven directly from the end of the crankshaft and secured at its free end to a surrounding hollow cylindrical shaft to which is secured a liquid-filled drum having inwardly directed radial vanes dividing its interior into radial pockets. Inside of each of the drums is an independently rotatable hub having radial blades extending into the radial pockets in the drum. The hub is fixed to the end of the crankshaft and, with its blades, is closely fitted in the drum. The blades are assembled in centered position in the pockets and the surrounding liquid. The drums on the shafts are geared together and from them is driven a part such as a supercharger having high effective inertia so that the drums tend to rotate at constant speed corresponding to the average speed of rotation of the shafts. This stabilization of the rotation of the drums may be assisted by driving various other engine accessories such as pumps and generator from the shafts that drive the drums.

When the crankshaft undergoes torsional vibration the hub and its blades vibrate with it and the liquid in the pockets in the drum tends to resist the movement. Small passages are provided in the blades to permit oil to pass from one side of the blades to the other in response to vibration. Passage of the oil through the small openings permits a limited amount of vibration of the shaft while exerting a frictional drag on it that dissipates a large part of the energy of vibration in the fluid. The fluid used is preferably lubrication oil and means is provided for supplying the drum with oil from the lubricating system of the engine to take care of leakage losses. Heat imparted to the oil as the result of the damping action may be dissipated in the oil cooler which forms a customary part of aircraft engine equipment.

The frictional drag produced by the action of the hydraulic damper increases approximately as the square of the amplitude if the frequency vibration is constant or with the square of the frequency if the amplitude of vibration is constant. This property makes the damper effective on both low frequency, high amplitude vibration and high frequency, low amplitude vibration.

The use of the supercharger as a stabilizing flywheel for the drums is quite efficient since the effective moment of inertia varies as the square of the speed of rotation so that where the supercharger rotates at, say, 8.8 times engine speed the flywheel effect is increased 77.4 times.

Important advantages are obtained by gearing the drums together. With this construction when the crankshafts vibrate out of phase, the drums being geared together resist the vibration without any need for an external stabilizing medium such as the supercharger. When the crankshafts vibrate in phase the supercharger is effective as described to stabilize the drums and enable the hydraulic dampers to function. The hydraulic dampers also protect the quill shafts from any vibrating load from the accessories.

In many installations the damping arrangement so far described will be found adequate. However hydraulic dampers have proven to be most effective in damping low frequency vibrations and for high frequency vibrations it may be found desirable to employ additional damping means particularly adapted for high frequencies. While we may employ devices such as the harmonic balancer described and claimed in Summers Patent No. 1,896,027 granted January 31, 1933, embodying a weight pivoted to the crankshaft and provided with resilient means to return it to mid position after displacement resulting from vibration, we have found it preferable to employ centrifugal pendulum dampers in which centrifugal force returns the weights to mid position. We prefer to mount the high frequency dampers at the ends of the crankshafts to which the hydraulic dampers are connected but other locations may prove desirable in other engine designs.

In the drawings:

Figure 2 is a sectional view taken on line 2—2 of Figure 1 showing the construction of centrifugal pendulum damper employed.

Figure 3 is a sectional view taken on line 3—3 of Figure 1 or 4.

Figure 4 is a sectional view taken on line 4—4 of Figure 3.

Figure 7 is an enlarged vertical section through a portion of one of the hydraulic dampers.

Figure 8 is a fragmentary view partly in section taken on line 8—8 of Figure 7.

Figure 10 is a fragmentary sectional view corresponding to the central portion of Figure 3 showing a modification.

The torsional damping means which is the subject of this patent is shown as applied to a 24-cylinder aircraft engine, having two crankshafts indicated at 10 and 10' geared at one end as indicated at 12 to drive a propeller 14. The propeller may be of any desired type and may be provided with hydraulic, electrical or mechanical means for varying the pitch of the blades. It will be found in some instances that the propeller at certain speeds may vibrate in such a manner as to impose torsional vibration on one or both of the crankshafts 10 and 10'. Such excitation is in addition to that normally resulting from operation of the engine.

In some instances we may prefer to drive a separate propeller from each crankshaft.

Each of the crankshafts is of the six throw type provided with seven main bearing journals indicated at 16. The bearings themselves are not illustrated. The throws of the crankshaft are indicated at 18 and to each of them is pivoted a pair of connecting rods, not shown, connected to pistons operating in the cylinders indicated diagrammatically at 17 in Figure 3. The cylinders are arranged in two banks of six cylinders each radiating from the crankshaft, the angle between the banks being 60°. The angle between the center lines of the adjacent banks of cylinders cooperating with different crankshafts is approximately 30°. The rods connected to the same crank pin may be of the well-known fork and blade type. The arrangement described provides a compact power plant with small frontal area and consequently low wind resistance and is particularly desirable for aircraft installations. However it is to be understood that our invention is equally applicable to engines having other crankshaft and cylinder arrangements, as well as similar mechanisms in which torsional vibration is encountered.

The vibration damping means is, in this embodiment, mounted at the ends of the crankshafts opposite the ends from which the propeller is driven although it will be understood that in some installations it may be desirable to provide one or the other or both of the torsional vibration dampers at the front or propeller end of the engine.

Figures 1, 9:
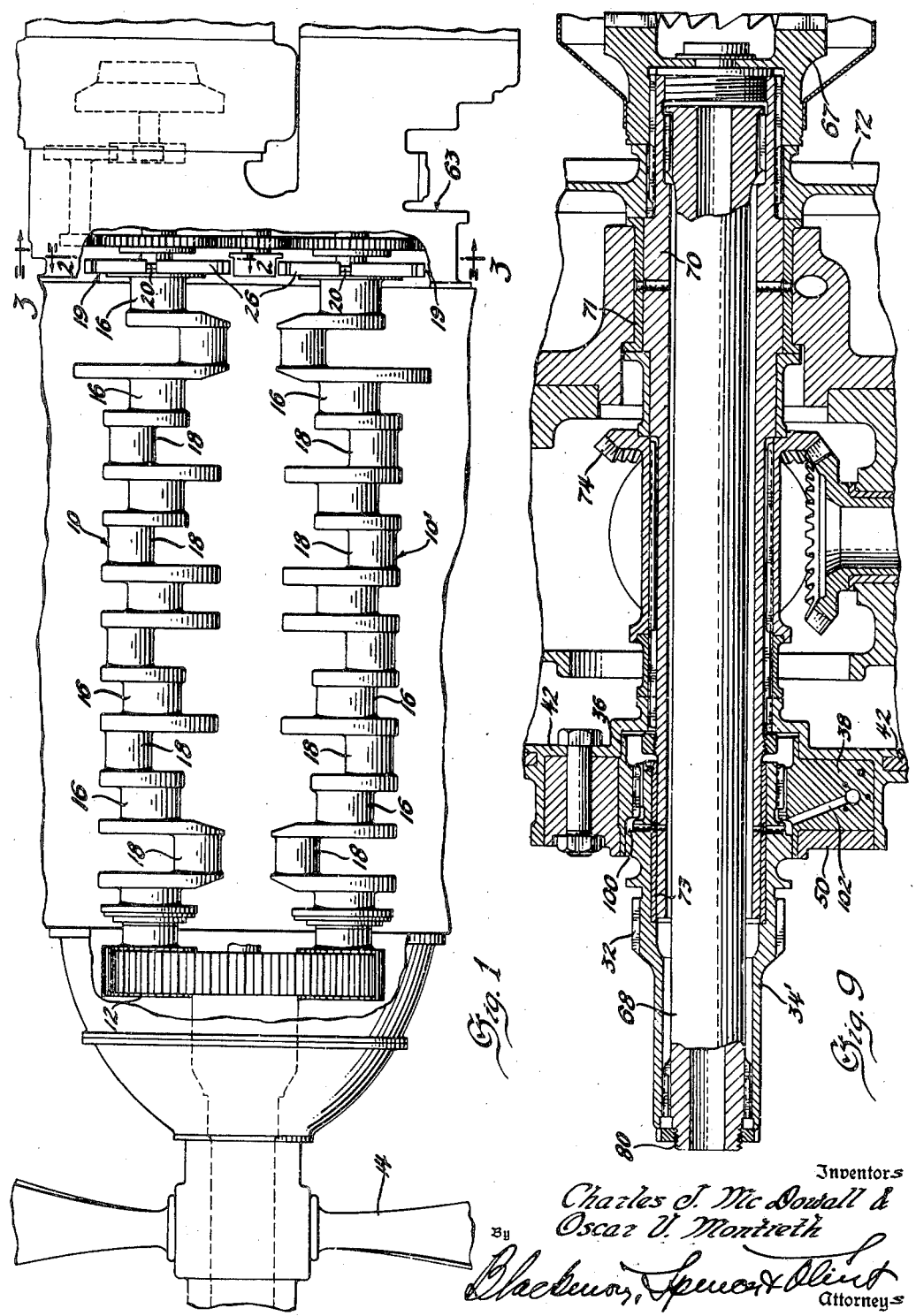
Figure 1 is a schematic plan view showing the general arrangement of the crankshafts, propeller drive and torsional vibration dampers as embodied in a 24-cylinder aircraft engine.
Figure 9 is a section taken on line 9—9 of Figure 4 with the crankshaft omitted.

As best shown in Figures 1, 2 and 4 there is secured to the rear of each of the crankshafts a torsional vibration damper 19 designed especially to damp out vibrations of high frequency. We have illustrated and prefer a centrifugal damper of the type shown in detail in Figure 2 consisting of a circular apertured plate 20 bolted to a suitable flange on the crankshaft. The plate is provided with apertures 22 through which pass headed pins 24 upon which are supported segmental weights 26. It will be noted that the diameter of the pins 24 is less than the diameter of the apertures 22 and also less than the diameter of the apertures 28 in the weights 26. It is well known in the art that centrifugal pendulum dampers of this type may be designed to suppress vibrations occurring a particular number of times per revolution of the shaft. In the engine illustrated we have found it desirable to employ three weights 26 to suppresss crankshaft vibrations occurring 4½ times per revolution, alternating with three weights 26 designed to suppress vibrations occurring 7½ times per revolution. In this type of centrifugal pendulum balancer the frequency of the vibration suppressed is determined by the pendulum length, which is the difference between the diameter of the apertures 22 and 28, and the diameter of the pins 24, and by the distance from the center of the shaft to the center of mass of the weight.

It will be understood by those skilled in the art that the weights 26 will normally be maintained in their outermost positions by the action of centrifugal force but should the crankshaft be excited by the explosions in the cylinders or by vibration of the propeller, or any other exciting force so as to set them vibrating torsionally the number of times per revolution for which they are tuned as centrifugal pendulums, they will oscillate at the same rate but out of phase with the vibration of the crankshaft. The oscillation of the weights will then produce a reaction on the crankshaft which will reduce its amplitude of vibration to within safe limits. While theoretically the transfer of vibratory energy from the crankshaft to the weights and from the weights back to the crankshaft will take place throughout the entire range of engine speed whenever the exciting force is present, in practice the weights remain substantially stationary except at speeds where the exciting force is substantially in resonance with a natural frequency of vibration of the crankshaft and at extremely low speeds when the weights simply rattle because the centrifugal force is then too small to overcome the force of gravity.

It has been found with this particular engine that the damper just described is best adapted to suppress high frequency vibrations, particularly three node vibrations. By three node vibrations we have reference to vibrations in which the flywheel effect of the propeller produces a node at its connection with the propeller drive, a second node occurs substantially at the center of the crankshaft, and a third node is produced by the flywheel action of the supercharger drive tending to produce substantially constant rotation of the drums 42 of the hydraulic damper now to be described.

As shown in Figure 4 plates 20 secured to the rear ends of crankshafts 10 and 10' are provided with internal splines 30 meshing with external splines 32 formed on sleeves 34 and 34'. One of the latter and its related parts are best shown in Figure 9. On the outer ends of sleeves 34 and 34' are splined hubs 36 carrying radial blades 38 projecting into radial pockets 40 formed in the drums 42 of the hydraulic dampers by vanes or spacers 44 extending inwardly from the periphery of the drum and secured to it by bolts indicated at 46. Vanes 44 are preferably connected by webs 50 forming one of the lateral walls of the radial pockets 40. The pockets 40 are preferably silver plated to eliminate galling.

Each of the blades 38 is provided with one or more small openings 52, best shown in Figure 8, to permit passage of a small amount of oil from one side of the blade to the other. Each blade is also provided with a large passage 54 at the ends of which are check valves 56 loosely confined in valve cages 58 riveted to the sides of the blades. The valve cages are provided with off center apertures 60 as shown in Figure 7. Suitable means is provided for supplying oil to all of the bearing surfaces of the engine in accordance with conventional practice, and the same oil circulating system is made use of to maintain the hydraulic dampers full of oil at all times. This is accomplished by supplying oil from the feed to adjacent bearings to an annular pocket 100 associated with sleeves 34 or 34' or parts carried thereby, and from the annular pocket oil is supplied through passage 102 to passages 54.

The drums 42 of the hydraulic dampers are driven from the crankshaft by the following means, the drive for the right hand drum as shown in Figure 4 being first described. As best shown in Figure 9 there is keyed or splined within the crankshaft end of sleeve 34' a torsionally flexible quill shaft 68 extending rearwardly substantially the full length of the accessory housing. To the rear end of quill shaft is splined sleeve 70 on which is splined clutch member 67 adapted to be engaged by the engine starter. The starter is of a suitable type, not shown. Sleeve 70 is supported in a suitable bearing 71 in the accessory housing and is piloted at its forward end in a suitable bearing 73 provided within the sleeve 34'. On the sleeve 70 are splined or keyed suitable gears arranged to drive various engine accessories. Thus gear 72 through suitable gearing, part only of which is shown, is adapted to drive the supercharger for the airplane cabin while bevel gear 74 is arranged to drive the coolant pump. Various other arrangements may be adopted if preferred for driving various accessories from the shaft 70.

On the end of shaft 70 adjacent the pilot bearing 73 the drum 42 of one of the hydraulic dampers is splined.

In similar manner there is splined within the outer end of sleeve 34 a torsionally flexible quill shaft 80 which at its opposite end is splined to sleeve 82 carrying gear 84 adapted to drive the oil pump through suitable gearing, not shown. Sleeve 82 also drives the drum 42 of the other hydraulic damper.

Drums 42 are provided with gear teeth as by bolting thereto ring gears 62 and in the form shown in Figure 3 the gears 62 are connected together by idler gear 64 suitably journaled in the accessory housing 63 secured to one end of the engine crankcase.

We have found it convenient in this engine to drive the overhead cam shafts from the idler gear or gears connecting the drums 42. Thus gear 64 through gears 110, 112, 114 and other gears not shown, drives shafts 116 and 118 through suitable bevel gears 115 arranged at their adjacent ends. Shafts 116 and 118, through the bevel gearing illustrated, drive shafts 120 which through suitable shafts and gearing, not shown, drive the overhead cam shafts of the inner banks of cylinders. To the ends of shafts 116 are splined shafts 122 which, through suitable gearing, drive the cam shafts of the outer banks of cylinders.

Provision is also made for driving the generator from the right hand drum 42 as shown on Figure 3 through pinion 123 and suitable gearing not shown.

Figure 5:
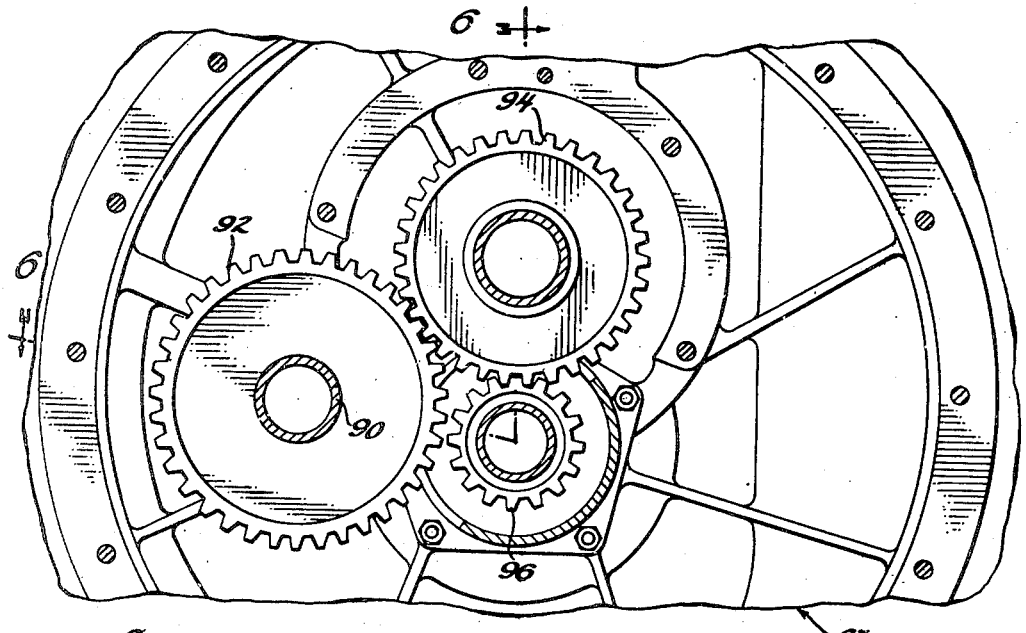
Figure 5 is a fragmentary sectional view taken substantially on the line indicated by the arrows 5—5 of Figure 4.
Figure 6:
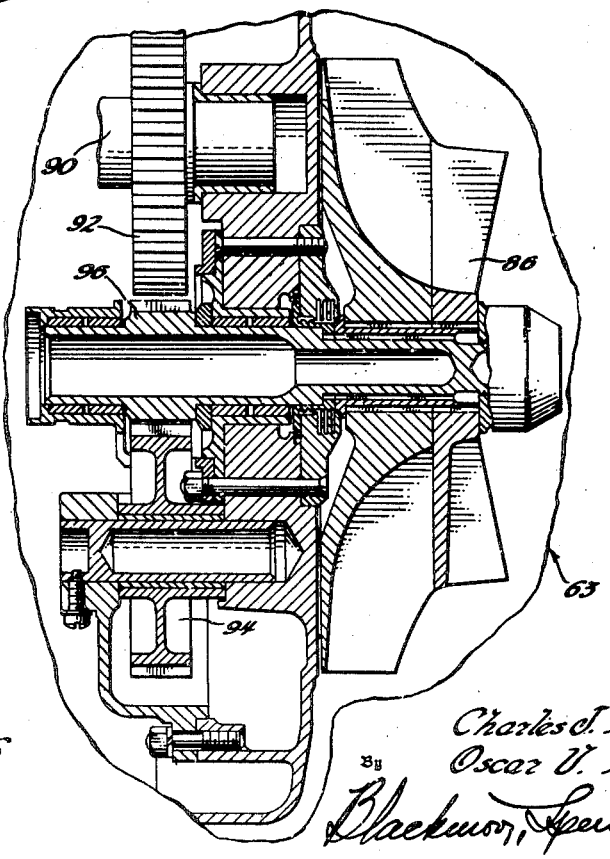
Figure 6 is a fragmentary sectional view taken on line 6—6 of Figure 5.

The left hand drum 42, as shown in Figure 4, through its gear 62 drives the supercharger impeller 86 through pinion 88, shaft 90, gear 92, the latter meshing with gear 94 driving pinion 96 carried by the driving shaft of the impeller as best known in Figure 5.

The operation of the hydraulic damper is as follows:

Normally the inner and outer members of the hydraulic damper rotate at substantially the same speed and the quill shafts 68 and 80 simply provide a yielding drive for the various accessories and the super charger. Under such conditions oil from the lubricating system is supplied to the pockets 40 of the hydraulic dampers through passages 102, valves 56 permitting the entrance of oil to supply leakage losses. Since there is normally no relative movement between the blades 38 and the drum there is no force tending to seat the valves 56.

The supercharger impeller 86 is comparatively light in weight but is driven at a very rapid rate through the reduction gearing described; for example, 8.8 times engine speed. Thus with an engine speed of 3,000 R. P. M. the supercharger speed would be 26,400 R. P. M. The effective moment of inertia of the impeller, or in other words the flywheel effect, varies as the square of the speed of rotation so that with the supercharger geared to rotate at 8.8 times engine speed the flywheel effect of the impeller is increased 77.4 times. This high effective inertia serves to stabilize the drums 42 of the hydraulic dampers so that they tend to maintain a uniform rate of rotation.

Should the crankshaft vibrate torsionally the oscillations will be transmitted to the inner members of the hydraulic dampers through sleeves 34 and 34' thereby tending to cause them to oscillate in their corresponding drums. At the same time the vibration will be transmitted from the crankshafts through sleeves 34 and 34' to the quill shafts 68 and 80 and thence through the surrounding sleeves 70 and 82 respectively to the drums 42 of the hydraulic damper.

The tendency of the inner members of the hydraulic dampers to vibrate in the drums as a result of torsional vibration of the shafts is yieldingly resisted by the oil in the pockets. The first thing that occurs is that the valve 56 seats on the side toward which the blade moves and thereafter movement is permitted only to the extent that oil passes throughout the small openings 52 or around the edges of the blades or escapes from the pockets adjacent the hub 36. Similar action takes place upon each oscillation of the crankshaft. The result is a very effective damping of the movement and dissipation of the energy of vibration in heating the liquid in the pockets.

The frictional drag resulting from the hydraulic damping increases approximately as the square of the amplitude at constant frequency. It also increases with the square of the frequency at constant amplitude. This property makes the damper effective on both low frequency high amplitude vibration and high frequency low amplitude vibration.

While we have stressed the importance of the stabilizing effect of the impeller 86, it will be understood that the various accessories driven through the quill shafts likewise exert a certain amount of stabilizng action. In addition, the yielding of the quill shafts in response to vibration may to some extent cause the movement of the drums and the accessories driven from the quill shafts to lag behind the vibratory movement of the crankchaft. The arrangement may therefore be regarded as an inertia load connected to the crankshaft through a torsion spring and reacting on the shaft in much the same manner as an harmonic balancer to damp out torsional vibration by out of phase exchange of energy between the shaft and the inertia load. While the described action may and probably does take place it will be understood that the principal damping is accomplished by hydraulic action.

It will be appreciated that by gearing together the shafts through a yielding connection such as the hydraulic dampers a certain amount of damping action is also obtained. For example, should one of the shafts vibrate torsionally and the other not, or should one shaft vibrate out of phase with the other, the shaft which is not vibrating will tend to damp out the vibration of the other. The action will, of course, be different where the shafts rotate in reverse directions but analogous results may be expected.

It will be noted that while one part of the hydraulic damper is directly connected to one of the crankshafts by sleeve 34 and 34' so as to rotate in phase therewith, the outer member or drum is flexibly driven not only through the corresponding quill shaft but also from the other crankshaft through the flexible drive including the quill shaft and the hydraulic damper. This manner of operation of the device is also hereinafter claimed.

The flexibility in the drive to some of the accessories provided by the quill shafts and, in the case of the impeller and other accessories, by the quill shafts as well as the hydraulic dampers has proven to be effective in safeguarding the necessary drives from injury during operation.

We have found the described arrangement particularly effective in the case of the 24-cylinder W-type engine referred to. Effective damping is obtained without the centrifugal pendulum dampers described but the high frequency three node vibrations have been somewhat further reduced in amplitude by the use of the pendulum dampers.

In some instances it is desirable to provide for rotation of the crankshafts in opposite directions instead of in the same direction and in such case the drums of the hydraulic damper are geared together by means of a pair of meshing idler gears 66 as illustrated in Figure 10. In such case, of course, the gearing employed to drive the propeller will necessarily be of different construction than that illustrated in Figure 1 to permit reverse rotation of the crankshafts. The reversely rotating crankshafts may be connected to drive reversely rotating propellers of the dual rotation type.

In some designs it may be found that adequate damping is obtained by providing the shafts with the centrifugal pendulum dampers and gearing them together substantially as described but without the employment of hydraulic dampers.

In other designs it may be found sufficient to provide but one of the geared together crankshafts with dampers as described or to provide one crankshaft with an hydraulic damper and the other with a reaction type damper. It may also prove desirable in some designs where the propeller is the source of vibration to apply one or both types of dampers to the propeller so as to suppress the vibration at the source.

In some installations it may prove adequate to employ but one hydraulic damper, driving one part of the damper from one shaft and the other part from the other shaft.

Various other modifications will occur to those skilled in the art.

The word "damper" is used herein to cover both dampers that dissipate the energy of vibration in friction losses and dampers that suppress or detune vibration by interchange of vibratory energy back and forth between the damper and the shaft or shaft system.

The expression "damper of the reaction type" is used in the claims to cover any type of damper operating wholly or partly by interchange of vibratory energy back and forth between the damper and shaft.

We claim:

1. The combination of a pair of power driven shafts subject to torsional vibration, a torsional vibration damper operatively connected to each of said shafts, and means at one end of said shafts for coupling said shafts together so that each of said dampers is effective to dampen torsional vibration in either or both of said shafts, a power output shaft, and means at the other end of said shafts operatively connecting both of said shafts to said power output shaft.

2. In power plant driving gear the combination of a pair of engine crank shafts subject to torsional vibration, a torsional vibration damper of the reaction type operatively connected to each of said shafts at one end thereof, and means for coupling said shafts together at said end so that each of said dampers is effective to dampen torsional vibration in both of said shafts, a power output shaft, and means connecting the other ends of each of said crankshafts to said power output shaft for driving the latter.

3. The combination of a pair of power driven shafts subject to torsional vibration, a torsional vibration damper on each of said shafts, each of said dampers comprising relatively movable parts, means interposed between said parts for dissipating in friction losses energy producing vibratory movement of either of said parts, means for driving one of said parts from said shaft so as to vibrate therewith, torsionally flexible means for driving the other of said parts from said shaft, and means for operatively connecting said last named parts of said dampers for joint rotation.

4. The combination of a pair of power driven shafts subject to torsional vibration. a torsional vibration damper on each of said shafts, each of said dampers comprising relatively movable parts, means interposed between said parts for dissipating in friction losses energy producing vibratory movement of either of said parts, means for driving one of said parts from said shaft so as to vibrate therewith, means including a torsionally flexible shaft for driving the other of said parts from said shaft, means for driving auxiliary mechanisms from said last named means and means for operatively connecting said last named parts of said dampers together for joint rotation.

5. The combination of a pair of power driven shafts subject to torsional vibration, a torsional vibration damper at one end of each of said shafts, each of said dampers comprising relatively movable parts, means interposed between said parts for dissipating in friction losses energy producing vibratory movement of either of said parts, means for driving one of said parts from said shaft so as to vibrate therewith, means including a torsionally flexible shaft for driving the other of said parts from said shaft, means for driving auxiliary mechanisms from said last named means and means for operatively connecting said last named parts of said dampers together for joint rotation, a power output shaft, and means connecting the other ends of each said power driven shafts to said power output shaft for driving the latter.

6. The combination of a plurality of shafts subject to torsional vibration, a torsional vibration damper comprising a part secured to and driven from one end of one of said shafts so as to vibrate in phase with said shaft, a part yieldingly driven from the corresponding end of the other of said shafts, means interposed between said parts for dissipating in friction losses vibratory energy producing relative movement of said parts, a power output shaft, and means connecting the other ends of each of said first-named shafts to said power output shaft for driving the latter.

7. The combination of a plurality of shafts subject to torsional vibration, a torsional vibration damper comprising a part secured to and driven from one of said shafts so as to vibrate in phase with said shaft, a part yieldingly driven from the other of said shafts, means interposed between said parts for dissipating in friction losses vibratory energy producing relative movement of said parts, stabilizing means connected to the yieldingly driven part of said damper tending to maintain its speed of rotation uniform, a torsional vibration damper of the reaction type mounted on one of said shafts, a power output shaft, and means for driving said output shaft from both of said first named shafts.

8. In engine driving gear, the combination of a pair of engine crankshafts subject to torsional vibration, a torsional vibration damper of the reaction type operatively connected to one end of each of said crankshafts, a torsional vibration damper of the type adapted to dissipate energy of vibration in friction operatively connected to each of said shafts at the said end, means for coupling said shafts together at the said end so that each of said dampers is effective to dampen torsional vibrations in either or both of said shafts, a power output shaft, and means at the other ends of said crankshafts for driving said power output shaft therefrom.

9. In engine driving gear the combination of a pair of crankshafts, a power output shaft, gearing at one end of the crankshafts arranged to drive the power output shaft, a torsional vibration damper at the opposite end of each of said shafts, each of said dampers including a part positively driven from the crankshaft and a part yieldingly driven from the crankshaft, means for damping relative movement of said parts, gearing connecting the yieldingly driven parts of said dampers, and rotatable means having high effective inertia driven from said yieldingly driven parts and tending to stabilize the rotation thereof.

10. In engine driving gear the combination of a pair of crankshafts, a power output shaft, gearing at one end of the crankshafts arranged to drive the power output shaft, a torsional vibration damper at the opposite end of each of said shafts, each of said dampers including a part positively driven from the crankshaft and a part yieldingly driven from the crankshaft, means for damping relative movement of said parts, gearing connecting the yieldingly driven parts of said dampers, rotatable means having high effective inertia driven from said yieldingly driven parts and tending to stabilize the rotation thereof, and a reaction type damper mounted on each of said shafts and adapted to reduce high frequency vibrations.

11. In engine driving gear, the combination of a pair of crankshafts, a torsional vibration damper at one end of each of said shafts, each of said dampers comprising a part positively driven from the crankshaft and a part yieldingly driven from the crankshaft, a hydraulic damping means interposed between said parts, gearing connecting the yieldingly driven parts of said dampers, and means having high effective inertia driven from said yieldingly driven means and tending to stabilize the rotation thereof.

12. In an engine, the combination of a pair of crankshafts having parallel axes, a driven shaft, gearing at one end of the crankshafts for driving the driven shaft therefrom, a centrifugal pendulum damper mounted on each of said crankshafts and adapted to damp out high frequency torsional vibrations, an hydraulic damper mounted on each of said crankshafts at the end opposite said driven shaft connection adapted to damp out low frequency torsional vibrations, each of said hydraulic dampers comprising a drum, means including a torsionally flexible quill shaft for driving said drum from said crankshaft, a rotor in said drum, a hollow shaft concentric with said quill shaft connecting said rotor and crankshaft for rotation in phase, said rotor having vanes extending into said drum, said drum being provided with means to hydraulically damp movement of said rotor with respect to said drum, gearing connecting said drums, rotatable means having a high moment of inertia driven from one of said drums and tending to maintain the speed of rotation of said drums constant, and an engine accessory driven from at least one of said crankshafts through said quill shaft.

13. In an engine, the combination of a pair of crankshafts having parallel axes, a driven shaft, gearing connecting said shafts at one end to said driven shaft, a centrifugal pendulum damper mounted on each of said crankshafts and adapted to damp out high frequency torsional vibrations, an hydraulic damper mounted on each of said crankshafts at the end opposite said driven shaft connection adapted to damp out low frequency torsional vibrations, each of said hydraulic dampers, comprising a drum, means including a torsionally flexible quill shaft for driving said drum from said crankshaft, a rotor in said drum, a hollow shaft concentric with said quill shaft connecting said rotor and crankshaft for rotation in phase, said rotor having vanes extending into said drum, said drum being provided with means to hydraulically damp movement of said rotor with respect to said drum, gearing connecting said drums, and rotatable means having a high moment of inertia driven from one of said drums and tending to maintain the speed of rotation of said drums constant.

CHARLES J. McDOWALL.
OSCAR V. MONTIETH.

REFERENCES CITED

The following references are of record in the file of this patent:

UNITED STATES PATENTS

| Number | Name | Date |
|---|---|---|
| 1,359,848 | Techel | Nov. 23, 1920 |
| 1,905,145 | Carter | Apr. 25, 1933 |
| 1,961,679 | Walti | June 5, 1934 |
| 1,965,742 | Junkers | July 10, 1934 |
| 2,255,773 | Heftler | Sept. 16, 1941 |
| 2,283,606 | Lewis | May 19, 1942 |
| 2,288,820 | Mas | July 7, 1942 |
| 2,333,122 | Prescott | Nov. 2, 1943 |
| 2,350,377 | Tjaarda | June 6, 1944 |

FOREIGN PATENTS

| Number | Country | Date |
|---|---|---|
| 163,966 | Germany | Nov. 16, 1933 |
| 360,045 | Italy | June 10, 1938 |
| 406,637 | Great Britain | May 24, 1932 |
| 506,067 | Great Britain | May 22, 1939 |